United States Patent
Mihm

(10) Patent No.: US 9,925,949 B2
(45) Date of Patent: Mar. 27, 2018

(54) AIRBAG MODULE WITH INTERNAL FRANGIBLE SEAM

(71) Applicant: TK Holdings Inc., Auburn Hills, MI (US)

(72) Inventor: Russell Joseph Mihm, Beverly Hills, MI (US)

(73) Assignee: TK Holdings Inc., Auburn Hills, MI (US)

(*) Notice: Subject to any disclaimer, the term of this patent is extended or adjusted under 35 U.S.C. 154(b) by 0 days.

(21) Appl. No.: 15/078,638

(22) Filed: Mar. 23, 2016

(65) Prior Publication Data
US 2017/0274862 A1  Sep. 28, 2017

(51) Int. Cl.
*B60R 21/207* (2006.01)
*B60R 21/233* (2006.01)
*B60R 21/2342* (2011.01)
*B60R 21/231* (2011.01)
*B60R 21/232* (2011.01)

(52) U.S. Cl.
CPC ........ *B60R 21/2342* (2013.01); *B60R 21/207* (2013.01); *B60R 21/232* (2013.01); *B60R 21/23138* (2013.01); *B60R 2021/23146* (2013.01); *B60R 2021/23316* (2013.01)

(58) Field of Classification Search
CPC ............ B60R 21/207; B60R 21/23138; B60R 21/233; B60R 21/2342; B60R 2021/23146; B60R 2021/23316
See application file for complete search history.

(56) References Cited

U.S. PATENT DOCUMENTS

| 5,395,134 A | * | 3/1995 | Gunn | B60R 21/2342 280/743.1 |
| 5,501,488 A | * | 3/1996 | Saderholm | B60R 21/233 280/739 |
| 5,584,508 A | * | 12/1996 | Maruyama | B60R 21/231 280/732 |
| 5,833,265 A | * | 11/1998 | Seymour | B60R 21/2342 280/743.1 |
| 6,142,507 A | * | 11/2000 | Okuda | B60R 21/23138 280/730.2 |
| 6,196,575 B1 | * | 3/2001 | Ellerbrok | B60R 21/233 280/729 |
| 6,247,727 B1 | * | 6/2001 | Hamada | B60R 21/2171 280/743.1 |

(Continued)

OTHER PUBLICATIONS

International Search Report dated Jun. 26, 2017 issued in PCT/US2017/023541.
Written Opinion issued in PCT/US2017/023541 dated Jun. 26, 2017.

*Primary Examiner* — Laura Freedman
(74) *Attorney, Agent, or Firm* — Gordon Rees Scully Mansukhani, LLP

(57) ABSTRACT

An airbag module for protecting an occupant of a vehicle. The module includes an airbag formed by connected first and second panels, wherein the airbag includes first and second inflatable chambers. The module also includes an inflator for providing inflation gas for the airbag. The first and second inflatable chambers are fluidly connected by a gas flow passage. The first and second panels are connected together along a volume controlling seam located in the second chamber. The seam is configured to give way during inflation of the airbag to thereby allow the second chamber to completely inflate.

20 Claims, 5 Drawing Sheets

(56) References Cited

U.S. PATENT DOCUMENTS

| | | | |
|---|---|---|---|
| 6,945,557 B2* | 9/2005 | Takimoto | B60R 21/206 280/730.1 |
| 7,134,691 B2* | 11/2006 | Dunkle | B60R 21/233 280/732 |
| 7,204,514 B2* | 4/2007 | Kanuma | B60R 21/231 280/743.1 |
| 7,549,672 B2* | 6/2009 | Sato | B60R 21/207 280/729 |
| 7,611,164 B2* | 11/2009 | Kai | B60R 21/207 280/728.1 |
| 7,819,421 B2* | 10/2010 | Naito | B60R 21/23138 280/730.2 |
| 8,087,692 B2* | 1/2012 | Klaiber | B60R 21/231 280/739 |
| 8,376,401 B2* | 2/2013 | Wipasuramonton | B60R 21/235 280/728.1 |
| 8,388,019 B2 | 3/2013 | Wipasuramonton et al. | |
| 8,528,934 B2* | 9/2013 | Kobayshi | B60R 21/207 280/729 |
| 8,684,408 B2* | 4/2014 | Thomas | B60R 21/231 280/730.2 |
| 9,085,280 B2* | 7/2015 | Katsumata | B60R 21/23138 |
| 9,290,151 B2* | 3/2016 | Fujiwara | B60R 21/231 |
| 9,592,788 B2* | 3/2017 | Wiik | B60R 21/23138 |
| 2002/0036402 A1* | 3/2002 | Heigl | B60R 21/232 280/743.2 |
| 2004/0124615 A1* | 7/2004 | Tanase | B60R 21/207 280/730.2 |
| 2006/0255570 A1 | 11/2006 | Wipasuramonton et al. | |
| 2009/0295134 A1 | 12/2009 | Wold et al. | |
| 2012/0235390 A1 | 9/2012 | Kraft et al. | |
| 2013/0079208 A1* | 3/2013 | Wiik | B60R 21/23138 493/405 |
| 2014/0306435 A1 | 10/2014 | Lee | |
| 2015/0014973 A1 | 1/2015 | Osterfeeld et al. | |

\* cited by examiner

AIRBAG MODULE WITH INTERNAL FRANGIBLE SEAM

Airbag modules generally include a stored airbag or cushion and an inflator. The modules may be located in a position to deploy into the passenger compartment of a vehicle in order to protect the occupant during a crash event. The airbag may include various inflatable chambers to ensure that the airbag provides appropriate cushioning, ejection mitigation, energy absorption, and other desirable protective features.

The chambers of the cushion may be designed so that the cushion reaches a desired pressure that will provide acceptable restraint to the occupant during a crash event. The cushion is pressurized by gas provided by the inflator. The inflator may vary in size, pressure, molar output, and fill speed as well as gas temperature. To ensure the desired internal cushion pressure is reached both the design and configuration of the cushion and/or the design and configuration of the inflator may be adjusted. For example, a smaller volume cushion may require a smaller inflator in order to reach the same internal pressure as a larger volume cushion. In some instances, the design of the cushion may require the use of a larger (and, therefore more costly) inflator. There are some design benefits to using a cushion with a smaller volume, or even a smaller effective volume, so that a smaller inflator may be utilized. For example, the smaller inflator may lower the cost of the module and/or the smaller cushion may allow for faster deployment due to the lower amount of inflation gas being required to fill the cushion.

The present application discloses several embodiments of an airbag module that provides for the benefits discussed above.

BRIEF DESCRIPTION OF THE DRAWINGS

Features, aspects, and advantages of the present invention will become apparent from the following description, appended claims, and the accompanying exemplary embodiments shown in the drawings, which are briefly described below.

DETAILED DESCRIPTION

Figure 1:
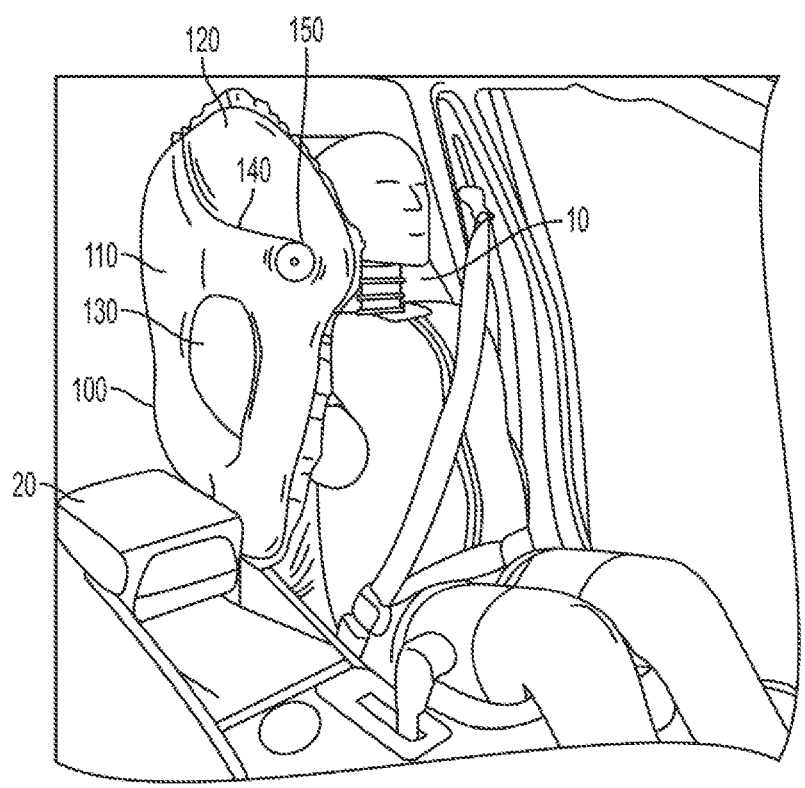
FIG. 1 is a schematic view of a deployed center side airbag.

Various features of the present invention will be described with reference to the drawings. Like numbers are used throughout the drawings to refer to the same or similar parts and in each of the embodiments of the invention hereafter described.

The application is directed to airbag modules for use in vehicles. According to an embodiment shown in FIG. 1, a center side airbag module is disclosed. The airbag module includes an airbag or cushion 100 that includes a first chamber 110 and a second chamber 120. The second chamber 120 is located to provide protection for the head of a vehicle occupant positioned in a vehicle seat 10. The airbag may include one or more non-inflatable regions 130. Also, the bag may include various internal seams 140 that function to separate the airbag 100 into two or more internal chambers. The seams may include circular shaped end portions 150 to assist in distributing the stress more evenly along the seam. Although not shown in FIG. 1, the airbag module includes an inflator for providing inflation gas for the cushion.

The airbag 100 is configured to deploy into a position between the occupant and the vehicle center console 20. However, in certain vehicle arrangements, the airbag 100 may be configured different to accommodate the structural configuration present in a vehicle that does not include a center console. For example, the airbag 100 may extend further below the seat bottom and use the seat bottom of the passenger and/or driver seats to provide support for the airbag in the absence of a center console.

Although FIG. 1 discloses a center side airbag, the structures disclosed herein is applicable to other airbag configurations such as a side curtain type airbag (see e.g., FIG. 4), or a side airbag mounted to the outboard side of the vehicle seat.

The airbag 100 described herein is preferably formed of two main panels. The panels may be referred to as inboard and outboard panels. The panels may be connected along together along a perimeter seam. The panels may also be connected at various internal seams, such as the upper seam 140 dividing the first chamber 110 from the second chamber 120. In addition, a closed seam 115 may be provided in the first chamber 110 to provide a non-inflatable region. A non-inflatable region may be used to reduce the overall airbag volume in order to reduce the amount of gas needed to be provided by the inflator.

Figure 2:
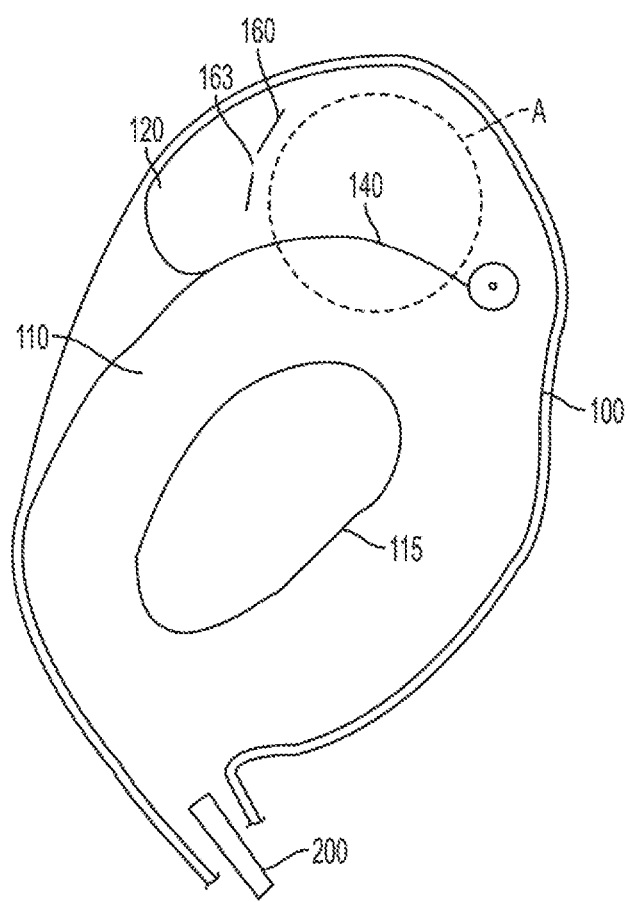
FIG. 2 is a plan view of a side airbag.

As shown in FIG. 2, the airbag 100 may include an internal seam 160. The seam 160 is considered to be a volume controlling or volume optimizing seam because the location, size and strength of the seam can control the volume of the airbag 100. The seam 160 is preferably formed by silicone beads located away from zone A, which is expected to be contacted by the head of the occupant. The internal seam 160 essentially closes off a portion of the upper chamber or second chamber 120 to thereby prevent full inflation of the entire second chamber 120. As a result, the volume of the second chamber 120 is initially reduced causing a relatively higher pressure in the region where the head of the occupant is expected to make contact. Thus, the internal seam 160 effectively creates a high loft area during the initial filling of the airbag 100. After the pressure in the upper chamber 120 reaches a certain pressure the seam 160 will give way or break. For example, the silicone bead peels so that the inboard and outboard panels of the airbag separate to allow the entire upper chamber 120 to fully inflate. After the seam 160 is released, the full coverage of the inflated airbag will be provided for the remainder of the crash event. The seam 160 is considered to be a volume controlling or volume optimizing seam because the location, size and strength of the seam can control the volume during inflation of the airbag 100.

The seam 160 is frangible because it allows the panels forming the airbag to separate at a particular pressure. The seam 160 preferably formed with a silicone bead. However, stitching may be used as an alternative to silicone or another suitable adhesive. The stitching would be configured to give way and break to allow the panels to separate at the particular pressure. As shown in FIG. 2, the seam 160 may include two separate seams separated by a gap 163. The two seams may be configured to provide the appropriate resistance to the airbag panels being separated to ensure the timing of the release of the seam is appropriate. For example, the length of the seam(s) may be adjusted depending on the inflator 200 being used. Also, the size of the gap 163 may be adjusted to change the strength of the seam. In general, the overall configuration of the seam (i.e., size, width, shape, number, etc.) may be adjusted depending on the type of vehicle and/or type of airbag.

For an airbag of the type shown in FIG. 2, the use of the volume controlling seam may provide faster times for pressurization and, also, substantial increases in the pressure of the upper chamber for a given inflator. For example, for a given inflator and diffuser arrangement, the time for the first pressure to be recorded in the upper chamber was reduced from approximately 28 ms to 23 ms due to the inclusion of the volume controlling seam. Also, the pressure at 60 ms after initiation was increased from approximately 50 kPa to approximately 125 kPa when compared to an airbag that did not include the volume controlling seam. Furthermore, the time for the two chambers to reach equilibrium pressure was reduced from approximately 190 ms to approximately 100 ms due to the inclusion of the volume controlling seam. In the example provided above, the seam separated approximately 70 ms after initiation. However, even after the volume of the upper chamber increases due to the seam separating, pressure in the upper chamber recovers quickly and remains above the pressure that would have been present if no volume controlling seam was provided.

Figure 3:
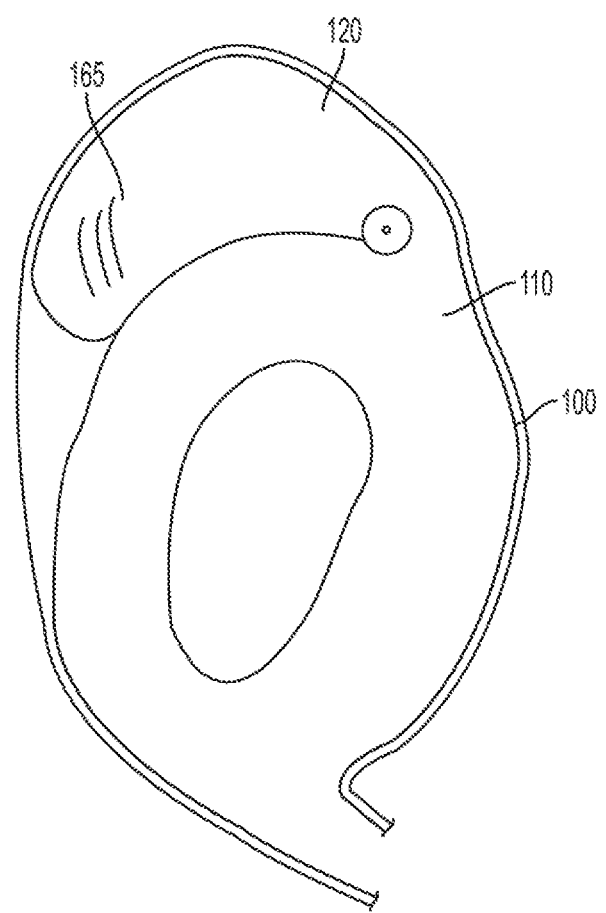
FIG. 3 is a plan view of an alternative embodiment of a side airbag.

As shown in FIG. 3, the airbag 100 may include one or more volume optimizing or controlling seams 165. For simplicity, in FIG. 3, three separate substantially parallel seams are shown. However, various combinations and arrangement of the seams may be provided as necessary to control the initial volume of the airbag 100 and the upper chamber 120. For example, multiple seams of lesser strength (e.g., thinner beads of silicone) may be used as an alternative to a single stronger seam (e.g., thicker silicone bead).

Figure 4:
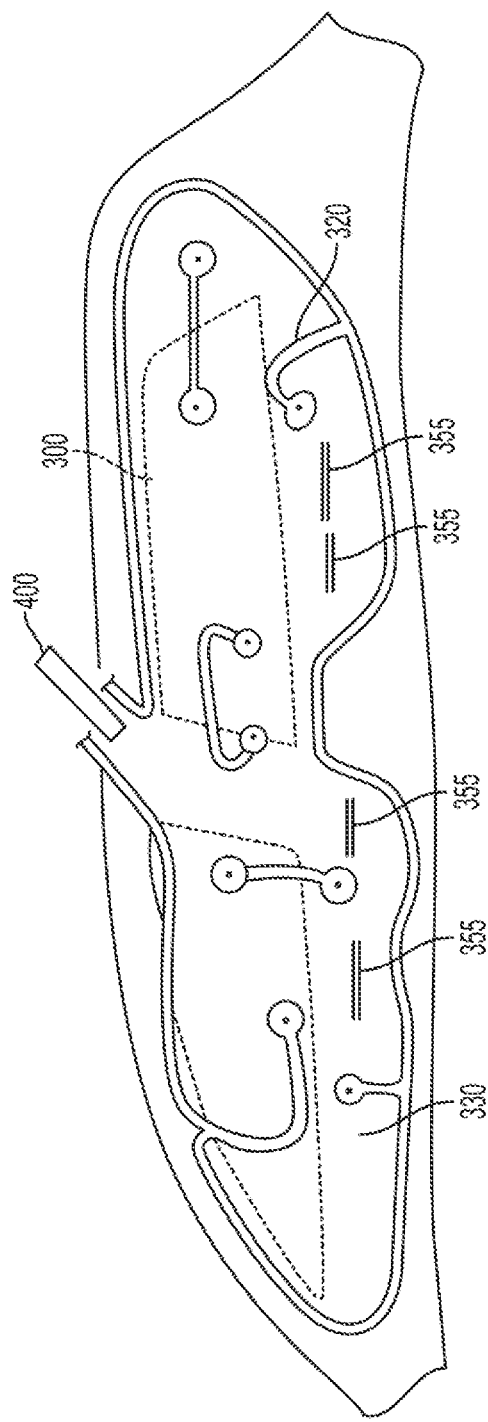
FIG. 4 is a plan view of a side curtain type airbag showing the curtain airbag deployed inboard of the side of the passenger compartment of the vehicle.

According to another alternative embodiment, a side curtain airbag module is disclosed. The module includes a curtain type side airbag 300. As shown in FIG. 4, the airbag or cushion 300 may include various chambers configured to protect the occupants of the vehicle. The cushion 300 is configured to be inflated by an inflator 400 and is configured to be stored in the roof side rail of the vehicle prior to deploying downward upon inflation. As shown in FIG. 4, the airbag 300 is located inboard of the vehicle pillars (e.g., A, B and C pillars) and the side windows of the vehicle. The module is shown in FIG. 4 with a mid mount inflator 400. However, the inflator may also be mounted near the front or rear of the airbag depending on the vehicle and airbag configuration desired for occupant protection. As shown in FIG. 4, the airbag may include one or more volume controlling seams 355. After the pressure in the airbag 300 reaches a certain pressure the seams 355 will give way. For example, the silicon bead will peel so that inboard and outboard panels forming the airbag separate to allow the entire airbag 300 to fully inflate, include the lower portion of the airbag located below the seams 355. After the seam 355 is released, the full coverage of the inflated airbag will be provided for occupant protection. Prior to the seam being release, the upper portion of the airbag will inflate in order to protect the head of the occupant and ejection from the vehicle. As shown in FIG. 4, the seams 355 are selectively located away from the regions of the airbag that will be contacted by the head of the occupant (e.g., the regions above the door trim covering the windows) thereby ensuring that these regions will have a relatively high loft during initial inflation of the airbag.

Figure 5:
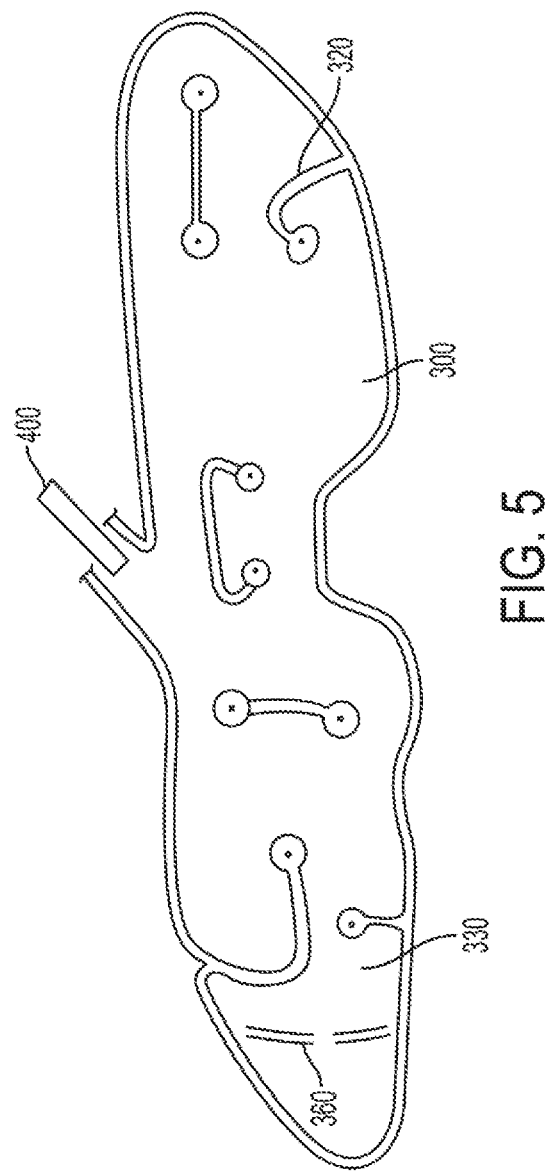
FIG. 5 is a plan view of a side curtain type airbag.

As shown in FIG. 5, the airbag or cushion 300 may include various chambers configured to protect the occupants of the vehicle. A volume controlling seam 360 may also be provided to control the inflation of a forward chamber 330. After the pressure in a forward chamber 330 of the airbag 300 reaches a certain pressure the seam 360 will give way. For example, the silicon bead will peel so that inboard and outboard panels forming the airbag separate to allow the entire forward chamber 330 to fully inflate. After the seam 330 is released, the full coverage of the inflated airbag will be provided during the remainder of the crash event.

Various combinations of volume controlling seams may be used. For example, the seams 355, 360 disclosed in FIGS. 4 and 5 may be provided in the same airbag so that inflation of the forward and bottom portions of the airbag is delayed. After the seams are released, the full coverage of the inflated airbag will be provided during the remainder of the crash event.

The various airbags described above, include a particularly placed sacrificial seam (e.g., silicone beads) in order to increase the chamber pressure for a select time period during a deployment of the cushion. After the sacrificial seam gives way (e.g., seam separates) the remainder of a given cushion chamber inflates to provide additional coverage for occupant protection. The volume controlling seam allows for the airbag to provide the required safety protection and coverage without the need for a larger inflator that would otherwise be necessary in order to inflate the airbag to the pressures required.

The inflator output does not need to necessarily be increased in order to reach and/or maintain a specified pressure value. Also, specific chambers of the cushion do not need to be changed in size. The specific impact area or region needed for restraint or cushioning may selectively be "closed-off" (through the use of a volume controlling seam) in order to reduce the volume in the region thereby increasing the pressure for a certain period of time required for specific performance requirements. After the time period during which higher pressure in a specific chamber is required, the seam can give way (e.g., silicone may peel) and the panels may separate to thereby increase the volume of the chamber to a position that provides the required coverage during the remainder of the crash event. In the case of silicone bead, the silicone can be adjusted to peel at whatever time period deemed necessary. Also, the volume controlling seam may be placed in an area where it will not negatively affect the restraint capacity of a cushion during the time period at which performance is demanded. See, for example, FIG. 2 wherein the seam 160 is located outside of the head protecting region or zone A.

By adjusting the placement, size, and shape of the volume controlling seam, a smaller inflator output/size may be used to yield the same airbag performance as if a larger inflator output/size were used to fill the same given cushion volume. The volume controlling seam allows for the selective choice of where and when and how much gas enters a cushion chamber depending on performance needed without increasing or decreasing the cushion's overall volume/size or using a larger inflator In the embodiment shown in FIG. 2, the volume controlling seam 160 allows for the upper head protecting chamber 120 to be increased in size to accommodate most any size occupant. For example, for a center side airbag through the use of the volume controlling seam 160 the upper chamber may be increased in size to protect a 95 percentile male. Thus, in the case of a center side airbag module, not only can a larger occupant be covered and protected, but also average sized occupants can be offered a greater amount of protection (larger coverage zone to protect them from larger passenger occupants, intrusion, etc.).

Curtain type airbags, such as shown in FIGS. 4 and 5, may also benefit from using a volume controlling seam 360. Many side curtain type airbags (i.e., Roof Rail Airbags or RRAB) are installed in vehicles with three rows of seats. Typically, very high output inflators are required in order to reach the airbag internal pressures required for ejection mitigation. Also, typically the use of extensive cushion chambering is reduced in order to lower the cost of manufacturing. However, volume controlling seams may be used in regions of the airbag that are not required to inflate to a high pressure for ejection mitigation. Thus, overall cushion rigidity could be increased through increased pressure during the time frame required to inhibit ejection (e.g., 1.5-6.0 seconds). At or after the required time period, the silicone seam would peel and provide full inflated coverage for the remainder of the crash event at an acceptable pressure. The seam would, thus, allow the inflator to fill the cushion to increased pressure without modifying the overall cushion coverage or size. Also, a smaller inflator may be used to produce good enough pressure in that same cushion and therefore greatly reduce cost of the airbag module.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to any precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "fore," "aft," "inboard," "outboard," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the converter and applicator machines shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An airbag module for protecting an occupant of a vehicle comprising:
   an airbag formed by connected first and second panels, wherein the airbag includes first and second inflatable chambers; and
   an inflator for providing inflation gas for the airbag, wherein
      the first and second inflatable chambers are connected by a gas flow passage;
      the first and second panels are connected together along a frangible seam located entirely within the second inflatable chamber, wherein the frangible seam releases during inflation of the airbag to thereby allow the second inflatable chamber to completely inflate;
      the inflation gas is introduced to the second inflatable chamber after passing through the first inflatable chamber; and
      the inflation gas enters the second inflatable chamber on only one side of the frangible seam.

2. The airbag module of claim 1, wherein the frangible seam comprises a bead of silicone located between the first and second panels.

3. The airbag module of claim 1, wherein the frangible seam comprises a pair of separated seams.

4. The airbag module of claim 3, wherein the pair of separated seams are along the same line with a gap located between ends of the pair of separated seams.

5. The airbag module of claim 3, wherein
   the pair of separated seams are positioned in parallel and a gap is located between the pair of separated seams; and
   the gap extends along the length of the pair of separated seams.

6. The airbag module of claim 1, wherein the frangible seam is located away from a region of the airbag configured to be contacted by a head of the occupant during a crash event.

7. The airbag module of claim 1, wherein the airbag module is configured to be connected to an inboard side of a seat of the vehicle and is configured to protect the occupant from a far side crash event.

8. The airbag module of claim 1, wherein
   the airbag module is configured to be installed on a side of a passenger compartment of the vehicle; and
   the airbag is configured to deploy into a position of a side curtain of the vehicle in order to protect the occupant from a side crash event.

9. An airbag module for protecting an occupant of a vehicle comprising:
   a first panel and a second panel, wherein the first and second panels are connected together to form an inflatable cushion; and
   an inflator for providing inflation gas for the inflatable cushion, wherein
      the inflatable cushion includes a first chamber and a second chamber;
      the first chamber is fluidly connected to the second chamber by a passage, and gas from the inflator is introduced to the second chamber via the first chamber and the passage;
      the cushion includes a volume controlling seam located entirely within the second chamber;
      the volume controlling seam connects the first panel to the second panel and is configured to break after a pressure in the second chamber reaches a predetermined value thereby allowing the second chamber to fully inflate; and
      the inflation gas enters the second chamber on only one side of the volume controlling seam.

10. The airbag module of claim 9, wherein the inflatable cushion is configured so that a peak pressure in the second chamber occurs prior to the seam separating.

11. The airbag module of claim 9, wherein the inflatable cushion is configured so that the pressure in the second chamber prior to the seam breaking is greater than the pressure in the fully inflated second chamber.

12. The airbag module of claim 9, wherein the inflatable cushion is configured to be stored along a roof rail of the vehicle and deploy downward in a curtain configuration.

13. The airbag module of claim 9, wherein the inflatable cushion is configured to deploy inboard of a vehicle seat substantially in a center of the vehicle.

14. The airbag module of claim 9, wherein the second chamber is configured to include a region positioned to contact a head of the occupant during a crash event involving the vehicle.

15. The airbag module of claim 9, wherein a portion of the second chamber that is positioned closer to the passage inflates to a higher pressure than a portion of the second chamber that is positioned on an opposite side of the volume controlling seam from the passage.

16. The airbag module of claim 9, wherein the volume controlling seam includes a plurality of seams.

17. The airbag module of claim 16, wherein the volume controlling seam comprises a bead of silicone.

18. An inflatable airbag for protecting an occupant of a vehicle in an event of a side impact crash involving the vehicle, wherein the airbag includes first and second panels connected together to form an inflatable cushion, the airbag comprising:
   a first and a second chamber separated by a first seam positioned within a perimeter of the airbag, the first and second chambers being connected by a gas passage; and
   a volume controlling frangible seam located in the second chamber, wherein
      the frangible seam connects the first panel to the second panel and is configured to break during inflation to thereby allow the second chamber to fully inflate;
      inflation gas is introduced to the second chamber after passing through the first chamber; and
      the inflation gas enters the second chamber on only one side of the frangible seam.

19. The airbag of claim 18, wherein the frangible seam comprises a bead of silicone.

20. The airbag of claim 18, wherein the frangible seam comprises a pair of silicone beads separated by a gap.

* * * * *